United States Patent [19]
Doi et al.

[11] Patent Number: 5,544,340
[45] Date of Patent: Aug. 6, 1996

[54] METHOD AND SYSTEM FOR CONTROLLING CACHE MEMORY WITH A STORAGE BUFFER TO INCREASE THROUGHPUT OF A WRITE OPERATION TO THE CACHE MEMORY

[75] Inventors: Toshio Doi, Kokubunji; Takehisa Hayashi, Sagamihara; Kenichi Ishibashi, Hachioji; Takeshi Takemoto, Sagamihara, all of Japan

[73] Assignee: Hitachi, Ltd., Tokyo, Japan

[21] Appl. No.: 362,755

[22] Filed: Dec. 22, 1994

Related U.S. Application Data

[63] Continuation of Ser. No. 709,277, Jun. 3, 1991, abandoned.

[30] Foreign Application Priority Data

Jun. 1, 1990 [JP] Japan .................................. 2-141484

[51] Int. Cl.[6] .................................................. G06F 12/08
[52] U.S. Cl. .......................... 395/445; 395/456; 395/459; 364/DIG. 1
[58] Field of Search .................................. 395/400, 425, 395/875, 824, 872, 445, 456, 459; 364/DIG. 1

[56] References Cited

U.S. PATENT DOCUMENTS

| 4,467,414 | 8/1984 | Akagi et al. ............................ 395/250 |
|---|---|---|
| 4,888,741 | 12/1989 | Malihowski .......................... 365/230.05 |
| 4,905,196 | 2/1990 | Kirrman ................................. 365/200 |
| 4,933,846 | 6/1990 | Humphrey et al. ...................... 395/287 |
| 5,125,085 | 6/1992 | Phillips ................................... 395/449 |
| 5,226,147 | 7/1993 | Fujishima et al. ....................... 395/445 |
| 5,353,427 | 10/1994 | Fujishima et al. ....................... 395/445 |

Primary Examiner—Tod R. Swann
Assistant Examiner—James Peikari
Attorney, Agent, or Firm—Antonelli, Terry, Stout & Kraus

[57] ABSTRACT

A method of controlling a cache memory disposed between a CPU and a main memory, wherein pairs of data and an address to be written in the cache memory are stored into a buffer memory. A plurality of pairs of data and an address read from the buffer memory are processed to compare the address fields thereof. Based on results of the comparisons, there is determined a write control for writing the data in the cache memory which has been subdivided into a plurality of banks. As a result, the plural pairs of data and an address are written into the plural banks of the cache memory, the addresses of the respective pairs being different from each other. With the provisions set forth above, the write operation can be independently conducted for each bank of the cache memory, thereby improving the write throughput.

10 Claims, 17 Drawing Sheets

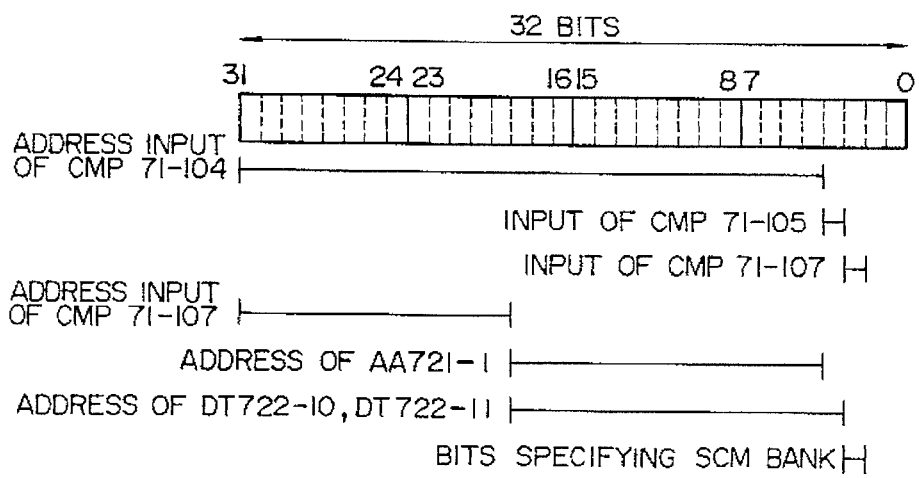

| CASE | OUTPUT OF 71-104 | OUTPUT OF 71-105 | CMP 71-106 | CMP 71-107 | OPERATION |
|---|---|---|---|---|---|
| 1 | MATCH | MATCH | UNMATCH | MATCH | SIMULTANEOUSLY WRITE TWO ENTRIES IN RESPECTIVE BANKS |
| 2 | MATCH | UNMATCH | UNMATCH | MATCH | SIMULTANEOUSLY WRITE TWO ENTRIES IN RESPECTIVE BANKS |
| 3 | MATCH | MATCH | MATCH | MATCH | MERGE TWO ENTRIES IN BYTE UNITS TO WRITE MERGED DATA |
| 4 | MATCH | UNMATCH | MATCH | MATCH | WRITE ONLY ONE ENTRY |
| 5 | UNMATCH | X | X | MATCH | WRITE ONLY ONE ENTRY |
| 6 | X | X | X | UNMATCH | WRITE OPERATION DISABLED (CACHE FAILURE) |

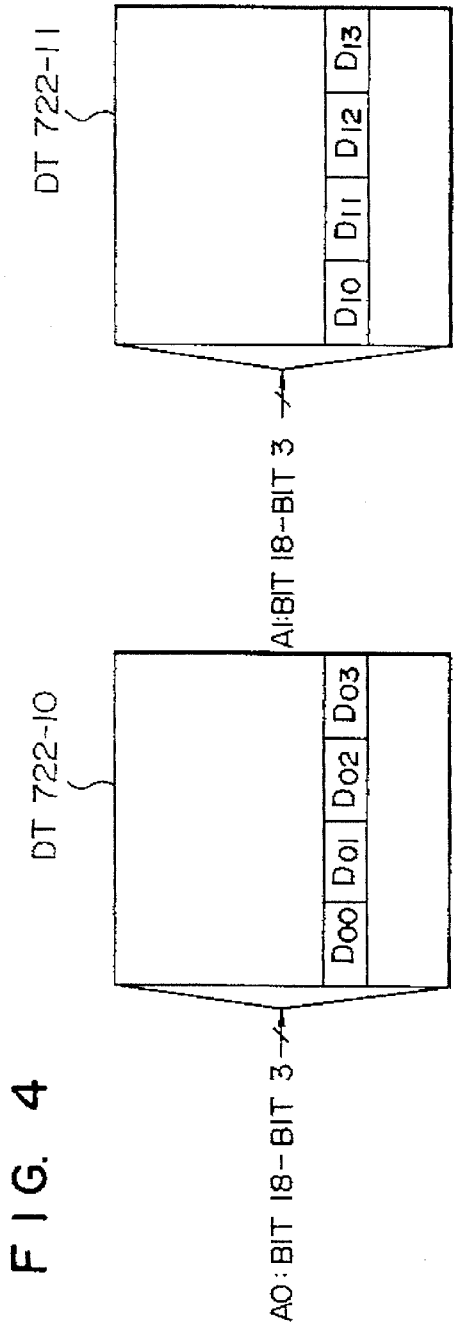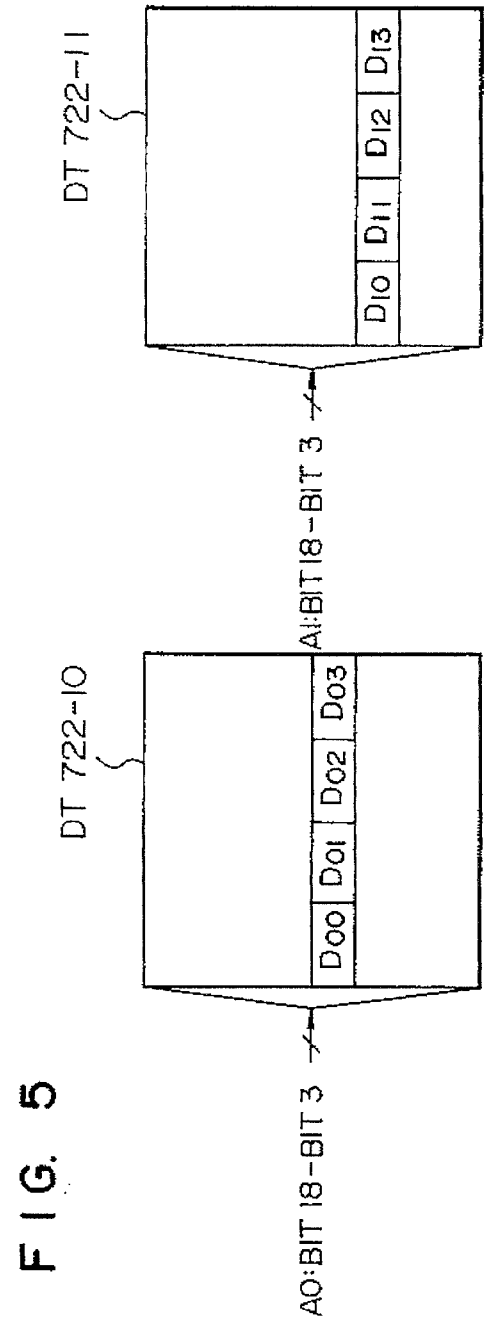

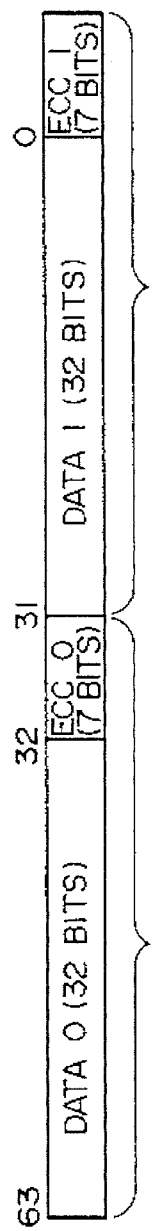
F I G. 12A
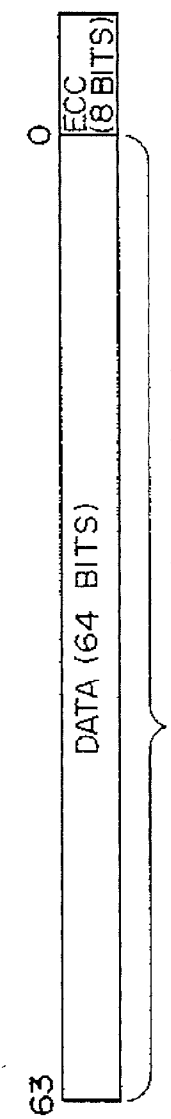
F I G. 12B
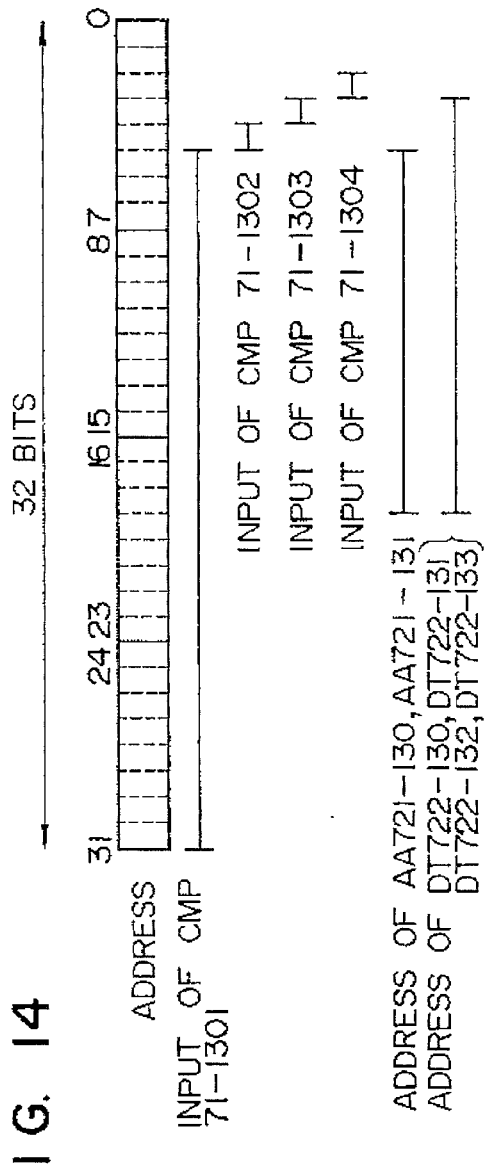
F I G. 14

FIG. 15

| CASE | OUTPUT OF 71-1301 | OUTPUT OF 71-1302 | OUTPUT OF 71-1303 | OUTPUT OF 71-1304 | OPERATION AA | OPERATION DT |
|---|---|---|---|---|---|---|
| 1 | MATCH | MATCH | MATCH | UNMATCH | A0 AND A1 INDICATE AN IDENTICAL ENTRY OF AA. READ THE ENTRY | SIMULTANEOUSLY WRITE TWO ENTRIES IN DIFFERENT BANKS |
| 2 | MATCH | MATCH | UNMATCH | UNMATCH | A0 AND A1 INDICATE AN IDENTICAL ENTRY OF AA. READ THE ENTRY | SIMULTANEOUSLY WRITE TWO ENTRIES IN DIFFERENT BANKS |
| 3 | MATCH | MATCH | MATCH | MATCH | A0 AND A1 INDICATE AN IDENTICAL ENTRY OF AA. READ THE ENTRY | MERGE TWO ENTRIES IN BYTE UNITS TO WRITE RESULTANT DATA |
| 4 | MATCH | MATCH | UNMATCH | MATCH | A0 AND A1 INDICATE AN IDENTICAL ENTRY OF AA. READ THE ENTRY | WRITE ONLY AN ENTRY |
| 5 | UNMATCH | MATCH | × | × | A0 AND A1 INDICATE DIFFERENT ENTRIES OF AN IDENTICAL BANK. TWO ENTRIES CANNOT BE SIMULTANEOUSLY READ (ONLY EITHER ONE THEREOF CAN BE READ AT A TIME) | WRITE ONLY AN ENTRY |
| 6 | | UNMATCH | MATCH | UNMATCH | A0 AND A1 INDICATE ENTRIES OF DIFFERENT BANKS. TWO ENTRIES ARE READ AT THE SAME TIME | SIMULTANEOUSLY WRITE TWO ENTRIES IN DIFFERENT BANKS |
| 7 | × | UNMATCH | UNMATCH | UNMATCH | A0 AND A1 INDICATE ENTRIES OF DIFFERENT BANKS. TWO ENTRIES ARE READ AT THE SAME TIME | SIMULTANEOUSLY WRITE TWO ENTRIES IN DIFFERENT BANKS |
| 8 | × | UNMATCH | MATCH | MATCH | A0 AND A1 INDICATE ENTRIES OF DIFFERENT BANKS. TWO ENTRIES ARE READ AT THE SAME TIME | MERGE TWO ENTRIES IN BYTE UNITS TO WRITE RESULTANT DATA |
| 9 | | UNMATCH | UNMATCH | MATCH | A0 AND A1 INDICATE ENTRIES OF DIFFERENT BANKS. TWO ENTRIES ARE READ AT THE SAME TIME | WRITE ONLY AN ENTRY |

×: DON'T CARE

METHOD AND SYSTEM FOR CONTROLLING CACHE MEMORY WITH A STORAGE BUFFER TO INCREASE THROUGHPUT OF A WRITE OPERATION TO THE CACHE MEMORY

This is a continuation of Ser. No. 07/709,277, filed Jun. 3, 1991, now abandoned.

BACKGROUND OF THE INVENTION

The present invention relates to a large scale integrated circuit for use in a computer, and in particular, to a method of controlling a high-performance cache memory implemented by use of an external memory chip.

In regard to a cache memory of the prior art, as described in JP-A-1-226053, there has been known a central processing unit (CPU) to be employed in a computer having a write-through cache memory. In this configuration, when data is written into the cache memory, the data is also stored in a storage buffer to be used in a first-in first-out processing system so that while a write operation is being processed, the computer executes a subsequent instruction without waiting for completion of the write operation.

In the conventional technology above, since a write port disposed to write data in the storage buffer and a port used to read data from the storage buffer so as to write the data in the cache memory outside the CPU have an identical data width, it is difficult to increase the throughput of the write operation in the cache memory. Consequently, when the quantity of data to be written in the store buffer by the CPU is increased as compared with the throughput, there appears a state where the storage buffer is continuously full of data, that is, free areas cannot be found therein. As a result, the storage buffer cannot function as a buffer, which leads to a problem that the throughput limits the processing speed of the CPU and hence lowers the performance efficiency thereof.

Furthermore, according to a system described in JP-A-61-223956, two entry items are simultaneously read from a storage buffer and then the respective addresses thereof are compared with each other to control a write operation in a storage based on a result of the comparison.

In the system of JP-A-61-223956, although the throughput of the write operation is improved to a certain extent, it is restricted to the cache where the entry items are ordinarily assigned with an identical address.

SUMMARY OF THE INVENTION

According to the present invention, the data width of the port provided to read data from the storage buffer and to write the data in a cache memory outside the CPU is expanded; moreover, based on locality or localizability of an address for a write operation, the number of accesses to the storage is reduced, thereby improving the throughput of the write operation.

According to the present invention, in order to increase the throughput of a data read operation obtaining data from a storage buffer, the bit width is increased to allow simultaneous reading of a plurality of entries therefrom. Furthermore, to improve the throughput of a data write operation to cache memory, the bit width of the write operation data is increased. Moreover, in order to reduce the number of accesses to the cache memory, the locality of the accesses used advantageously in order to reduce the number of unnecessary accesses to the cache memory. In addition, to reduce the access count, the cache memory is provided with control signals allowing the data write operations to have with various bit widths. Moreover, in order to perform data write operations in a parallel manner in the cache memory, the cache memory is subdivided into a plurality of banks such that the write operations are accomplished independently in each of the memory banks.

A plurality of entries are read from the storage buffer so as to simultaneously write the data entries into the cache memory, thereby improving the throughput. Moreover, based on the locality of each access to the cache memory, the number of cache memory accesses is reduced to minimize time required for a write operation. Furthermore, data is independently written into each bank of the cache memory to lower the cache memory access count, further decreasing the write operation time.

BRIEF DESCRIPTION OF THE DRAWINGS

The foregoing and other objects, advantages, manner of operation, and novel features of the present invention will be understood from the following detailed description when read in connection with the accompanying drawings wherein:

FIG. 2 is a diagram illustratively showing formats of input signals supplied to comparator circuits and other elements of FIG. 1;

FIG. 3 is a diagram showing a control method adopted in the configuration of FIG. 1;

FIGS. 4, 5 and 6A, 6B and 6C are diagrams showing operation examples related to the control method of FIG. 3;

FIGS. 12A and 12B are diagrams showing examples of an error correction code (ECC);

FIG. 14 is a diagram showing input signals fed to comparator circuits and other elements of FIG. 13;

FIG. 15 is a schematic diagram showing a control method adopted in the configuration of FIG. 13;

DESCRIPTION OF THE PREFERRED EMBODIMENTS

Referring now to the accompanying drawings, a description will be given of embodiments according to the present invention.

Figure 7:
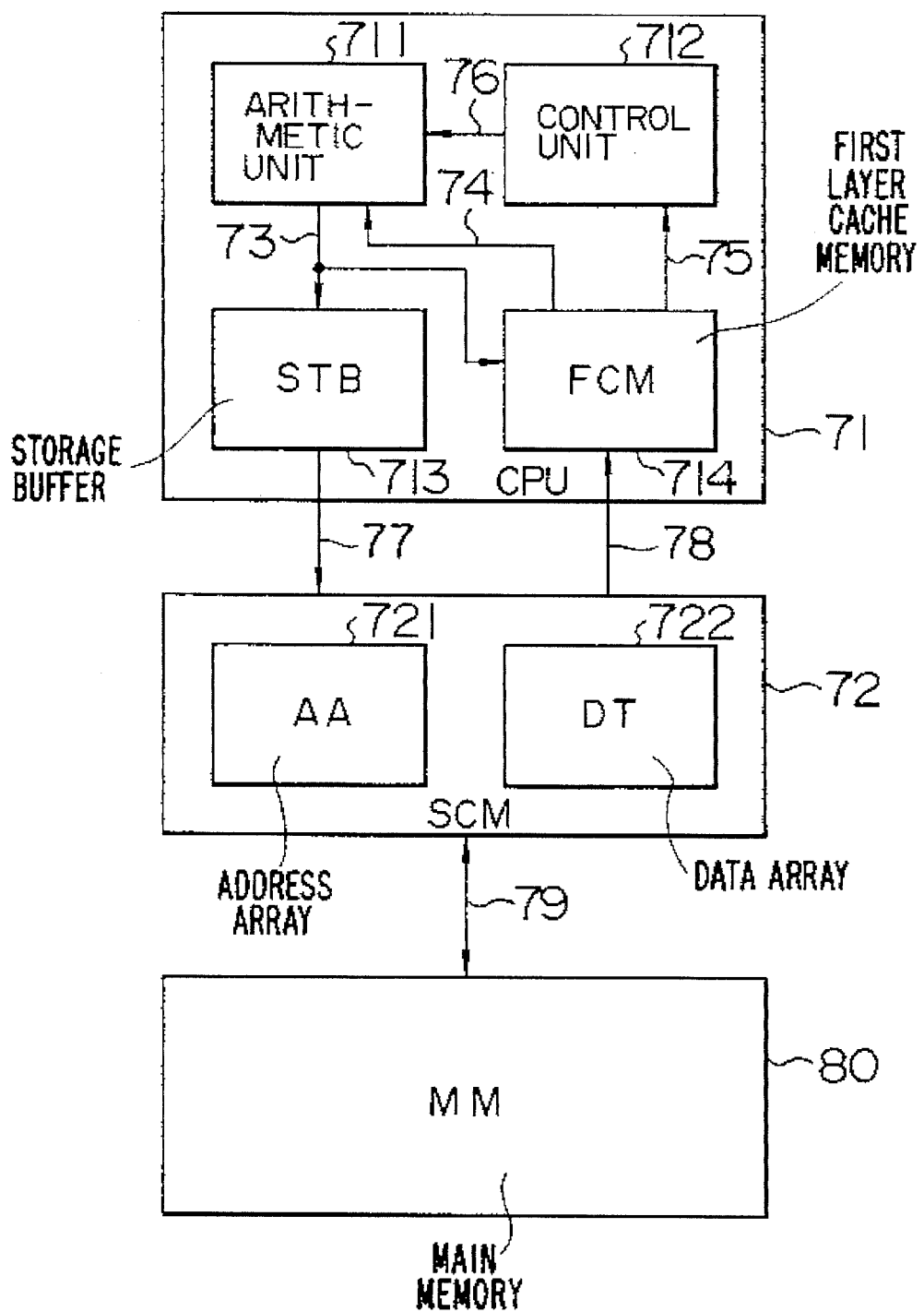
FIG. 7 is a schematic diagram showing the constitution of a computer associated with an embodiment according to the present invention.

FIG. 7 shows an example configuration of a computer to which the present invention is applied.

The constitution of the computer of FIG. 7 fundamentally comprises a central processing unit (CPU) 71, a second layer cache memory (SCM) 72, and a main memory (MM) 80. The CPU 71 includes an arithmetic and logic unit (ALU) or an arithmetic unit 711, a control unit 712, a storage buffer (STB) 713 and a first layer cache memory (FCM) 714. Moreover, the SCM 72 includes an address array (AA) 721 and a data array (DT) 722.

The system further includes a write path 73 to be used by the arithmetic unit 711 to write computation results in the STB 713 and the FCM 714, a read path 74 adopted by the ALU 711 to read data from the FCM 714, a read path 75 employed by the control unit 712 to read data from the FCM 714, a control signal 76 to be sent from the control unit 712 to the arithmetic unit 711, a write path 77 disposed to write data of the STB 713 of the CPU 71 into the SCM 72, and a transfer path 79 adopted to transfer data between the SCM 72 and the MM 80.

In order to increase the memory access speed in a computer system, it has been a common practice to provide a cache memory. Particularly, in the case where the CPU is implemented in one chip of a large scale integration, when the cache memory is formed in the same chip, the cache memory access speed is increased as compared with a configuration in which the cache memory is provided at a location external to the CPU chip. However, in this case, due to limitations of the surface area of the chip, the capacity of the memory cannot be easily increased. In this situation, in order to overcome this difficulty, as shown in the embodiment of FIG. 7, a second layer cache memory (SCM) 72 is additionally disposed between the cache memory in the CPU chip 71 and a large-capacity main memory (MM) 80 implemented by using a dynamic random access memory (DRAM) or the like outside of the chip.

The second layer cache memory (SCM) 72 may be configured with a high-speed static RAM (SRAM) or the like outside of the chip. The operation speed and the capacity of the SCM 72 are set to values between those of the first layer cache memory (FCM) 714 and the main memory (MM) 80, respectively. As a result, with the FCM 714 and the SCM 72, a large-capacity cache memory is implemented. The SCM 72 comprises the address array (AA) 721 and the data array (DT) 722. Data is written in the DT 722, whereas the AA 721 is used to control the contents of the SCM 72.

Data necessary for the arithmetic unit 711 and the control unit 712 in the CPU 71 are transferred thereto, if the FCM 714 is beforehand loaded with a copy of data, from the FCM 714 via the paths 74 and 75, respectively. If the copied data is missing in the FCM 714 and is found in the SCM 72, the data is transferred from the SCM 72 to the FCM 714 via the path 78. The data is then further fed to the arithmetic unit 711 and the control unit 712. On the other hand, in a write operation, the FCM 714 is operated in a write-through mode. When data is written in the FCM 714 via the path 73, the data is simultaneously loaded in the STB 713. The storage buffer STB 713 is operated in a first-in/first-out processing manner. A write operation on the second layer cache memory (SCM) 72 is completed when the write operation on the store buffer (STB) 713 is finished. Namely, the arithmetic unit 711 and the control unit can proceed to an execution of a subsequent instruction without waiting for the completion of the write operation actually writing data in the second layer cache memory (SCM) 72. The data load in the storage buffer (STB) 713 is written in the second layer cache memory (SCM) 72 in an asynchronous fashion with respect to the operations respectively of the arithmetic unit 711 and the control unit 712.

Figure 1:
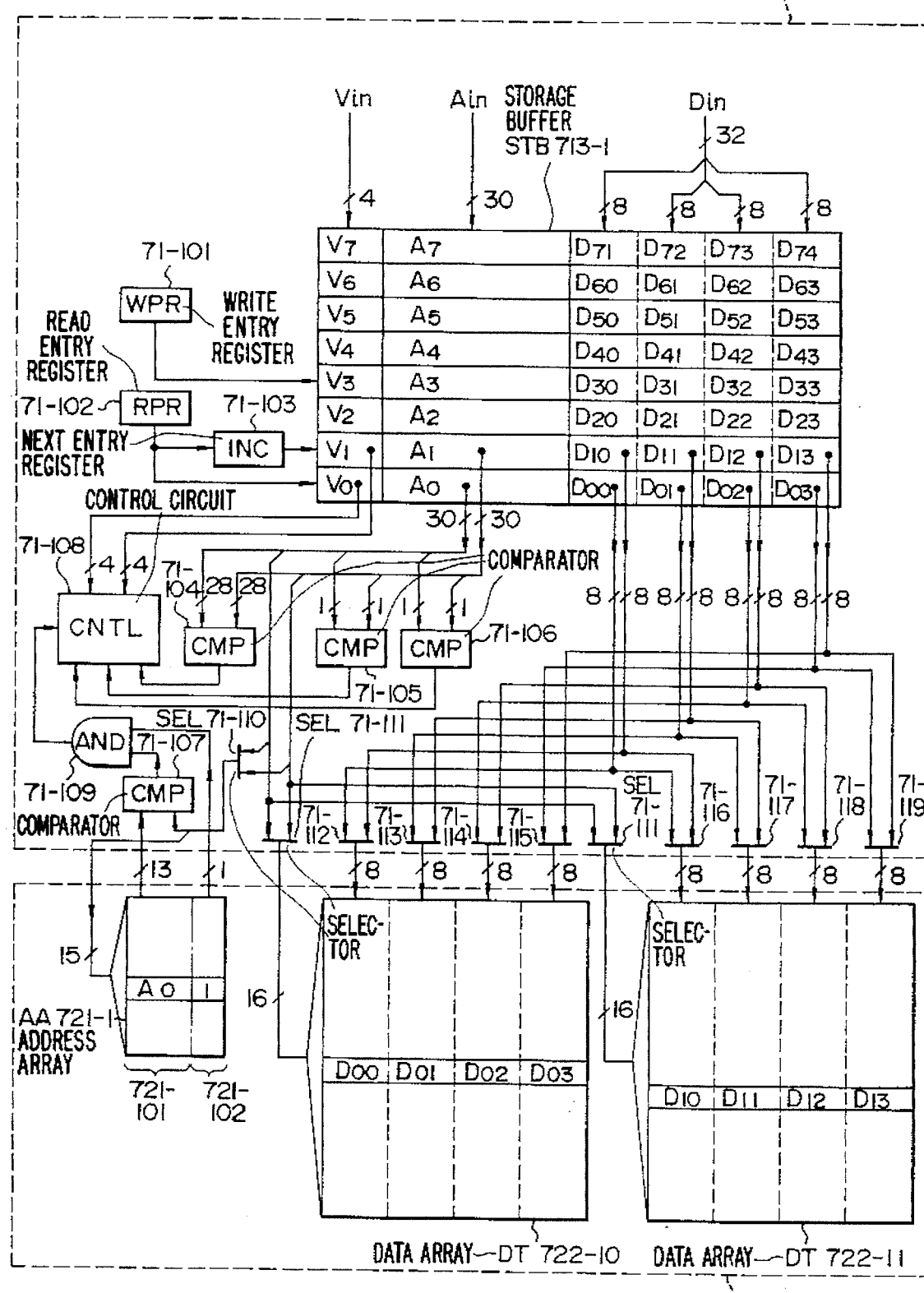
FIG. 1 is a schematic diagram showing an embodiment according to the present invention.

FIG. 1 shows portions related with the write operation control of the second layer cache memory (SCM) 72 in an embodiment according to the present invention. This configuration includes a CPU 71, a storage buffer STB 713-1, an address array AA 721-1 of the SCM 72, data arrays DT 722-10 and DT 722-11 of the SCM 72, a register WPR 71-101 specifying a subsequent write entry of the storage buffer (STB) 713-1, a register RPR 71-102 designating a next read entry to be read from the storage buffer (STB) 713-1, a register INC 71-103 denoting a next entry to be read after the entry specified by the register RPR 71-102, an address input part Ain of the storage buffer (STB) 713-1, a data input port Din of the storage buffer (STB) 713-1, an input port Vin supplying valid data specification bits to the storage buffer (STB) 713-1, comparator circuit CMP 71-104 to CMP 71-107, and a storage buffer control circuit CNTL 71-108.

The system of FIG. 1 further includes an AND gate 71-109, selectors SEL 71-110 to SEL 71-119, an address field 721-101 of the address array (AA) 621-1, and a valid bit field 721-102 of the address array (AA) 721-1.

Furthermore, FIG. 2 shows bit positions of addresses supplied as comparison objects to the comparator circuits CMP 71-104 to CMP 71-107 and bit positions related with the address array (AA) 721-1 and the data arrays (DT) 722-10 and 722-11.

Moreover, FIG. 3 shows procedures of write operations to be processed in the SCM 72 depending on comparison results attained from the comparator circuits CMP 71-104 to CMP 71-107 of FIG. 1.

In the constitution of FIG. 1, the STB 713-1 is a storage buffer having eight entry fields or entries each including a data field (32 bits) $D_{00}$ to $D_{74}$, an address field (30 bits) $A_0$ to $A_7$, and a valid data specification bit (four bits) $V_0$ to $V_7$. A pair of data and an address thereof to be stored are input from the input ports Ain and Din to be written into an entry specified by the content of the register (WPK) 71-101. For an execution of a write instruction, an entry is used in the storage buffer (STB) 713-1. In this operation, even when the data to be written therein has a bit width smaller than 32 bits, an entry is reserved for the data. Consequently, the valid data specification bits are supplied from the input port Vin as information notifying valid bytes in the data field. For example, in a case of an execution of a two-byte write instruction, when data is written in the data fields $D_{30}$ and $D_{31}$, "1100" is loaded in the valid data specification bits $V_3$. Moreover, in the example of FIG. 1, the second layer cache memory (SCM) 72 is controlled in 16-byte units (the unit will be referred to as a block herebelow); furthermore, a block corresponds to an entry of the address array (AA) 721-1.

The characteristic of the embodiment of FIG. 1 resides in a path employed to write data obtained from the storage buffer (STB) 713-1 into the second layer cache memory (SCM) 72 and a control method of controlling the write path. In this connection, the storage buffer (STB) 713-1 includes two registers RPR 71-102 and INC 71-103 each specifying a read position such that the first data and the subsequent data can be simultaneously read out from the storage buffer (STB) 713-1. In addition, the data array of the second layer cache memory (SCM) 72 is subdivided into two banks i.e. DT 722-10 and DT 722-11. Each data bank can receive an address and data in an independent manner. With the provisions set forth above, by using of the addresses $A_0$ and $A_1$ and the valid data specification bits $V_0$ and $V_1$ simultaneously read from the storage buffer (STB) 713-1, a high-speed write operation is implemented when writing data from the storage buffer (STB) 713-1 into the second layer cache memory (SCM) 72, which will next be described in detail.

Figure 6A:
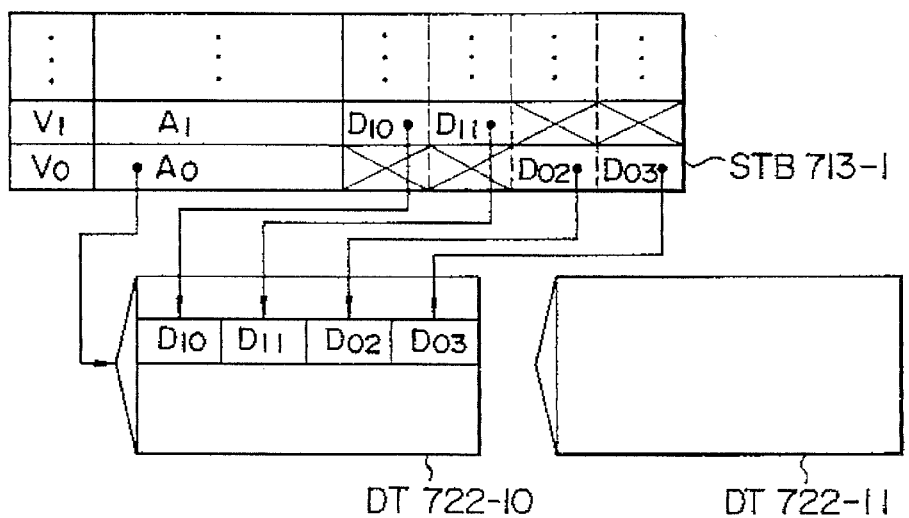
Figure 6B:
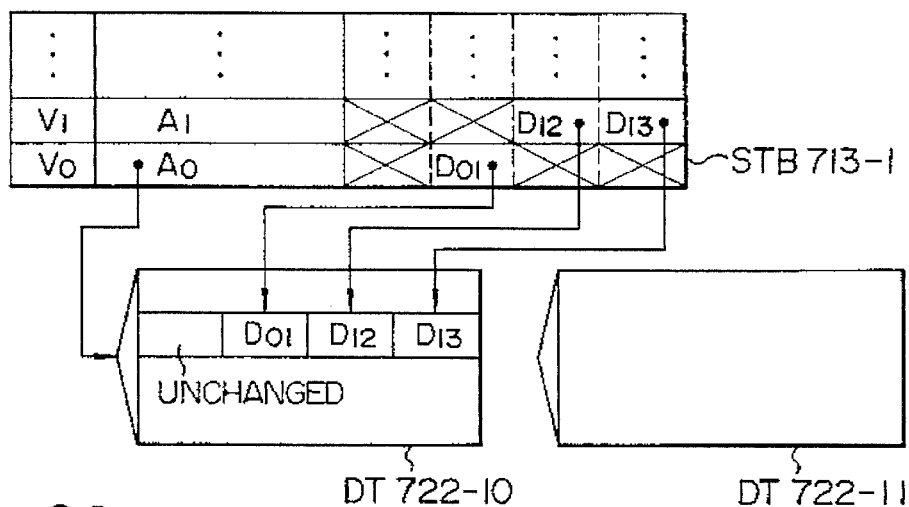
Figure 6C:
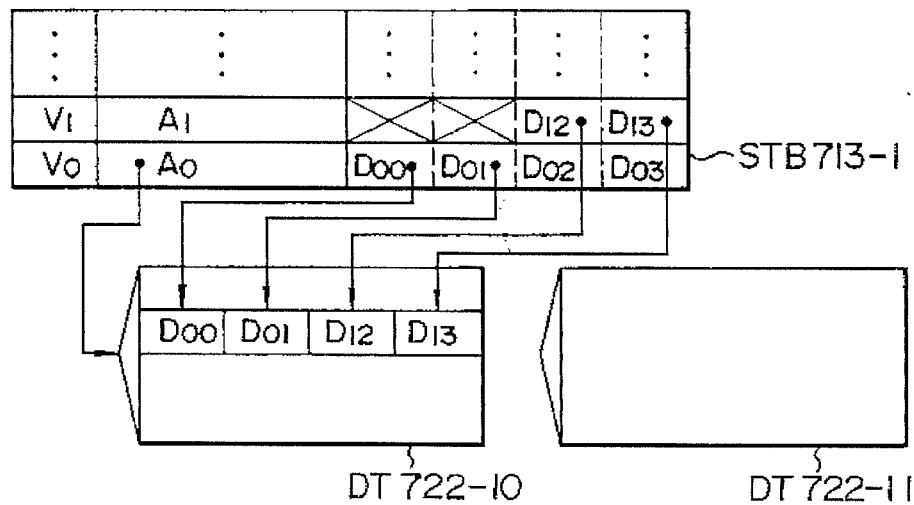

First, the addresses $A_0$ and $A_1$ are compared with each other by the comparator circuits CMP 71-104 to CMP 71-106 to distinguish the five write operation procedures described in FIG. 3 i.e. case 1 to case 5. In cases 1 to 3, the two entries exist in an identical block. FIG. 4 shows an example of case 1 wherein data items of two entries can be simultaneously written into the data array (DT) 722-10 and the data array (DT) 722-11. FIG. 5 shows an example associated with case 2 in which, although an address of the data array (DT) 722-10 is different from an address assigned to the data array (DT) 722-10, since an address input can be independently processed in each data array, the data of two entries can be simultaneously written in the data arrays in a similar manner as for case 1 above. FIGS. 6A to 6C show examples of cases related with case 3 where both entries are to be written in an identical bank (DT) 722-10 at an identical address. First, in the operation of FIG. 6A, the valid bytes are not overlapped with each other between the respective data fields of the entries in the storage buffer (STB) 713-1, and a total of four bytes are valid in the entries. In this situation, the data entries are merged to be written into the data array (DT) 722-10. In FIG. 6B, the valid bytes are not overlapped with each other between the data fields of the respective entries in the storage buffer (STB) 713-1 and the number of valid bytes thereof is less than four. In this case, the entries are merged to be loaded in the data array (DT) 722-10 with some bytes remaining unchanged. Next, FIG. 6C shows a case where the valid bytes are overlapped with each other between the data fields respectively of the entries in the storage buffer (STB) 713-1. In this case, the entry of the storage buffer (STB) 713-1 specified by the register (INC) 71-103 is preferably written in the second layer cache memory (SCM) 72 for the following reasons. That is, the data $D_{12}$ and $D_{13}$ have been written in the storage buffer (STB) 713-1 by an instruction executed after an instruction has written the data $D_{02}$ and $D_{03}$ therein. As set forth above, in the cases 1 to 3 of FIG. 3, data of two entries of the storage buffer (STB) 813-1 can be simultaneously written in the cache memory (SCM) 72. Resultantly, in accordance with the present invention, the write operation throughput can be doubled. In this regard, in cases, 4 and 5 since two entries are related to different blocks, the entry data cannot be written simultaneously in the cache memory (SCM) 72, namely, only the data $D_{00}$ to $D_{03}$ are written therein. In each of these cases, before the data is actually written into the cache memory (SCM) 72, it is necessary to determine whether or not the write address makes a hit in the cache memory (SCM) 72 by the comparator circuit (CMP) 71-107 and the AND gate 71-109. In this check, more specifically, the address read from the field 721-101 of the address array (AA) 721-1 is compared with the content of bits 31 to 19 of the address field $A_0$ for a matching therebetween; moreover, the content of the field 721-102 denoting validity of the entry of the address array (AA) 721-1 is confirmed by the AND gate 71-109.

Next, a description will be given of another embodiment of FIG. 8 according to the present invention. The configuration of FIG. 8 includes a storage buffer (STB) 713-8, an address read port 71-801 of the storage buffer (STB) 713-8, a data read port 71-802 of the storage buffer (STB) 713-8, a register (SAR) 71-804, comparator circuits (CMP) 71-805 and 71-806, an address register (MAR) 71-807, a data register (WDR) 71-808, an AND gate 71-809, a hit signal HIT8, an address array (AA) 721-8 of the cache memory (SCM; not shown), and a data array (DT) 722-8 of the cache memory (SCM). In this configuration, a reference numeral 71-810 denotes the characteristic portion Of the embodiment. Moreover, FIGS. 9A and 9B are signal timing charts useful to explain the operation of the embodiment of FIG. 8.

Figure 8:
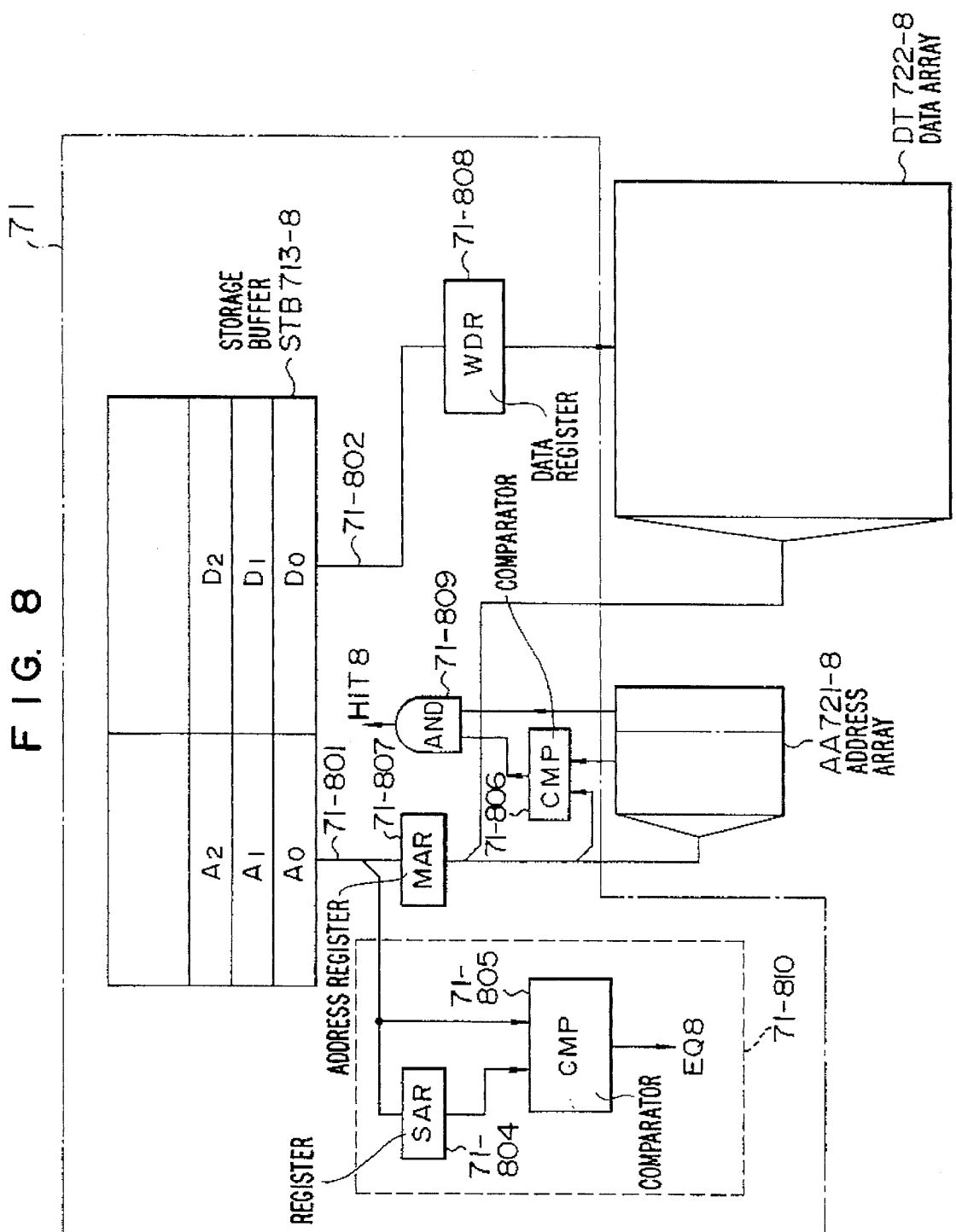
FIG. 8 is a diagram illustratively showing another embodiment according to the present invention.
Figure 9A:
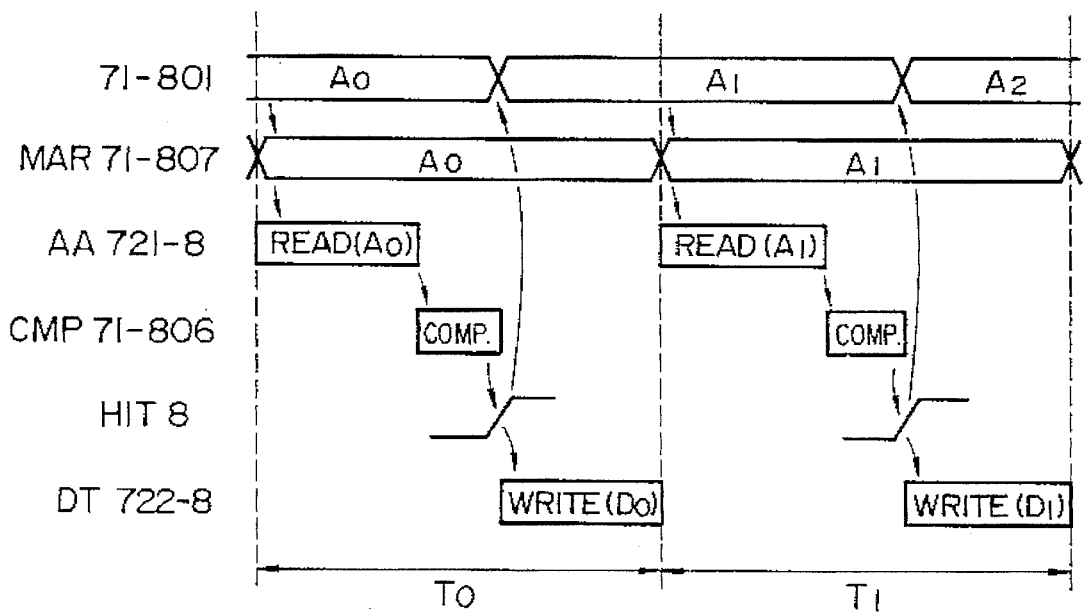
FIGS. 9A and 9B are schematic signal timing charts showing operation examples related to FIG. 8.
Figure 9B:
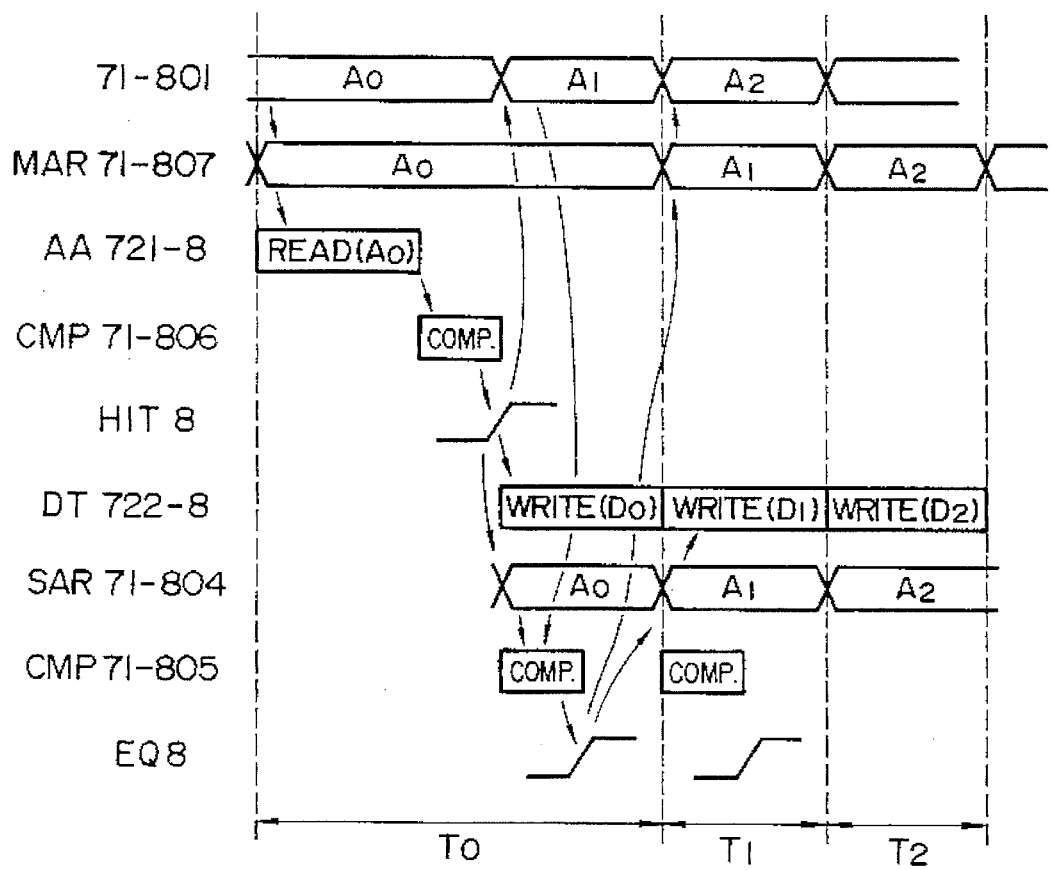

First, the signal timing chart of FIG. 9A shows an operation conducted by a configuration implemented by removing the portion 71-810 from FIG. 8. In this case, the address read port 71-801 is being supplied with an address $A_0$, which is first read in the address register (MAR) 71-807 to read data associated therewith from the address array (AA) 721-8. The obtained data is checked by the comparator circuit (CMP) 71-806 and the AND gate 71-809 to determine whether or not a hit occurs in the cache memory (SCM). If a hit is confirmed, the data $D_0$ is continuously written into the data array (DT) 722-8, thereby completing the write operation. Assuming that the write operation takes a period of time $T_0$, a period of time $T_1$ required for the next write operation of data $D_1$ is equal to $T_0$. On the other hand, FIG. 9B shows an operation accomplished by the embodiment of the present invention, namely, in the configuration of FIG. 8 including the portion 71-810. In this situation, when it is found during a write operation of data $D_0$ that a hit occurs in the cache memory (SCM), the address is stored in the register (SAR) 71-804; moreover, in concurrence with a write operation in the data array (DT) 722-8, the content of the register (SAR) 71-804 is compared with the address $A_1$ to determine whether or not both data belong to an identical block. FIG. 9B shows the case where each of the addresses $A_0$, $A_1$, and $A_2$ is in an identical block. In this case, for a write operation of data $D_1$, the content of the address array (AA) 721-8 need not be obtained, namely, the data can be written directly into the data array (DT) 722-8. This is also the case of data $D_2$. With this provision, the number of accesses to the cache memory (SCM) for a write operation is reduced to half the original value i.e. the number of accesses required when the provision above is not employed. Moreover, since the check for the memory hit conducted by the comparator circuit (CMP) 71-806 and the AND gate 71-809 is not necessary, the values of $T_1$ and $T_2$ are each minimized to less than half the value of $T_0$, which at least doubles the write operation throughput of the cache memory (SCM).

In this connection, for simplification of description, the configuration of FIG. 8 includes an address port and a data port for each of the read ports 71-801 and 71-802 from the storage buffer (STB) 713-8. However, like the embodiments of FIG. 1, even when two address ports and two data ports are disposed thereto, the present invention is also applicable such that by combining both cases with each other, the write operation throughput can be increased to four times that developed in the prior art. Next, a description will be given of relationships between the embodiment of FIG. 1 and that shown in FIG. 8. In the structure of FIG. 1, for a pair of two entries (to be referred to as an entry set) read from the storage buffer (STB) 713-1, the address comparison is accomplished within the entry set. In contrast thereto, the feature of the latter case is that the comparison is achieved between two consecutive entry sets. Although these embodiments are different from each other in this point, it is, on the other hand, common therebetween that the locality of the access is advantageously utilized, i.e. in many cases, the write operation in a computer system is achieved in a successive fashion in an identical block.

Figure 10:
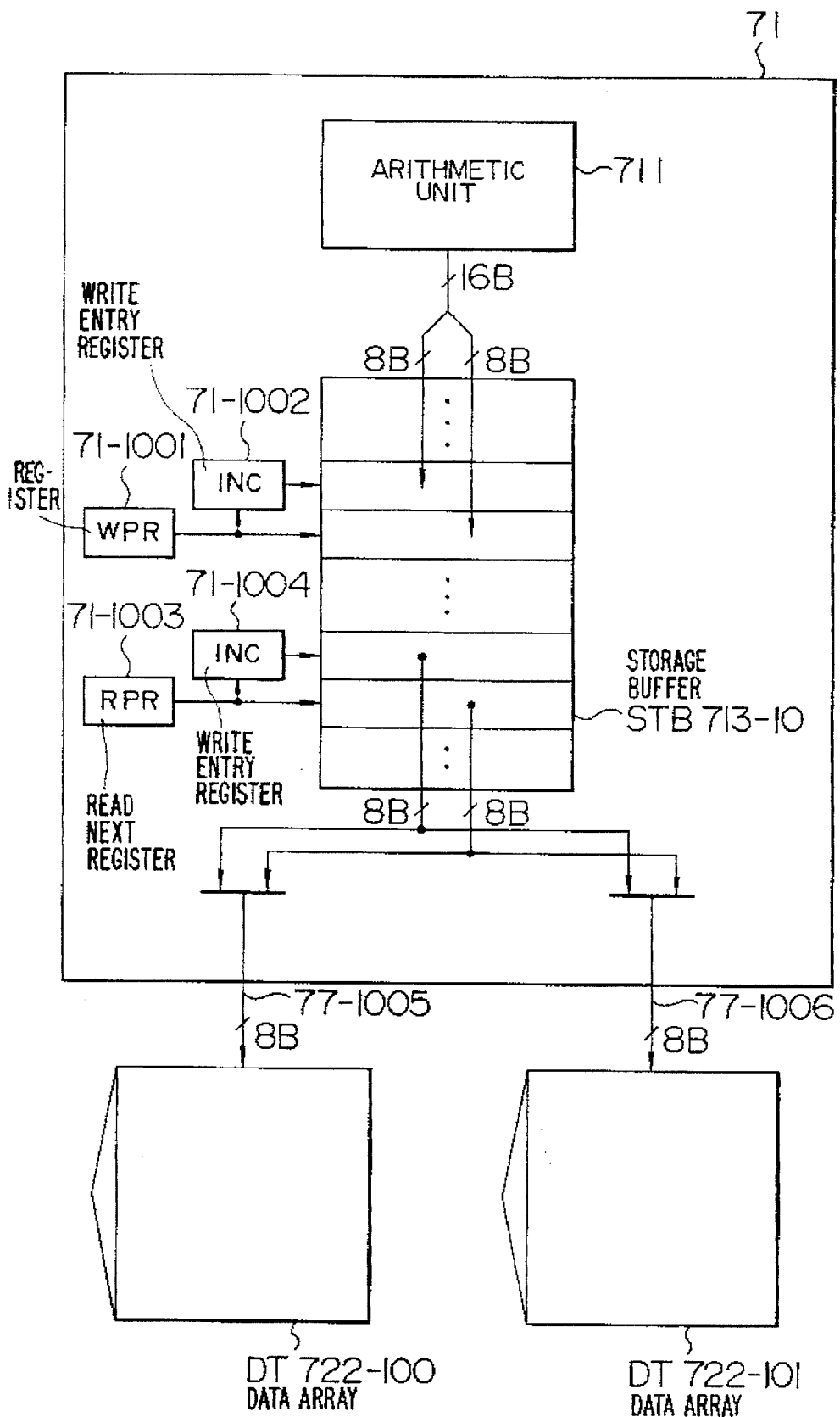
FIGS. 10 and 11 are diagrams each showing still another embodiment according to the present invention.

Subsequently, the configuration of FIG. 10, showing another embodiment according to the present invention, comprises a storage buffer (STB) 713-10, a register (WPR) 71-1001 specifying a next write entry of the storage buffer (STB) 713-10, a register (INC) 71-1002 specifying a write entry subsequent to the entry specified by the register (WPR) 71-1001, a register (RPR) 71-1003 specifying a next read entry of the storage buffer (STB) 713-10, a register (INC) 71-1004 denoting a next read entry subsequent to the entry specified by the register (RPR) 71-1003, a CPU 71, data buses 77-1005 and 77-1006, and data arrays (DT) 722-100 and 722-101 of the cache memory (SCM).

In an ordinary computer system, a data item of an integer is represented with four bytes (32 bits) in many cases, whereas a data item of a number expressed with a floating point requires a larger bit width, that is, such a data item is represented in double precision (eight bytes) or quadruple precision (16 bytes) in most cases. Consequently, to receive a floating-point data item in quadruple precision, a storage buffer must be provided with a bit width of 16 bytes. However, in this case, for example, when an integer data item is written therein, a valid portion of the data field is considerably decreased in the storage buffer and hence the buffer utilization efficiency is lowered. In the embodiment of FIG. 10, in order to prevent the deterioration of the utilization efficiency, the data field of the storage buffer (STB) 713-10 has a bit width of eight bytes; moreover, two write ports are disposed in the storage buffer (STB) 713-10 so that a quandruple-precision data item is written in the 16-byte unit therein by using these ports simultaneously.

Figure 11:
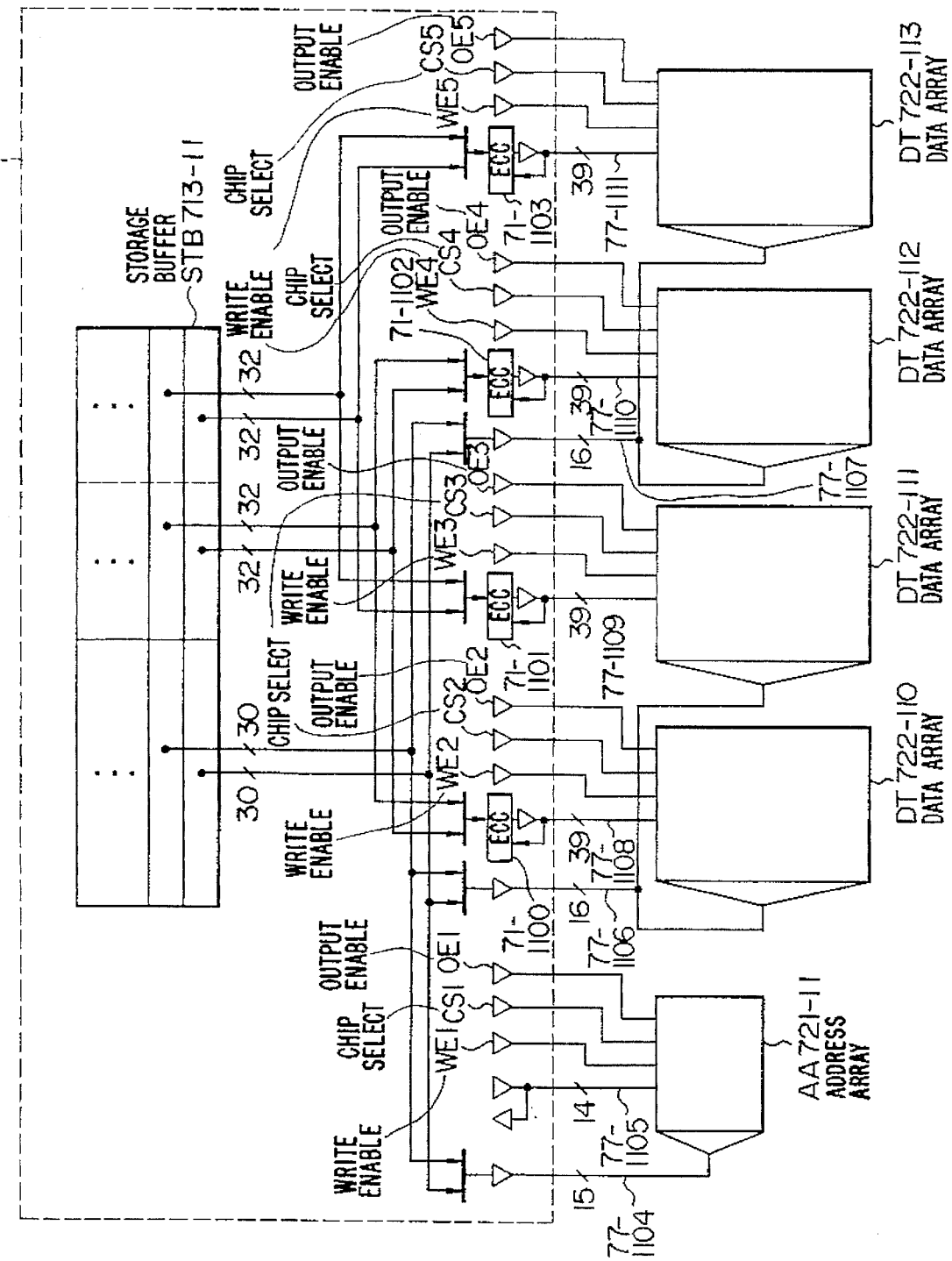

Referring next to FIG. 11, a description will be given of a still another embodiment according to the present invention. This configuration includes a storage buffer (STB) 713-11, an address array (AA) 721-11 of the cache memory (SCM), data arrays (DT) 722-110 to 722-113 of the cache memory (SCM), circuits such as CMP circuits 71-1100 to 71-1103 (which will be described later), an address bus 77-1104 of the address array (AA) 721-11, a data bus 77-1105 of the address array (AA) 721-11, an address bus 77-1106 of the data arrays (DT) 722-110 and 722-111, a data bus 77-1108 of the data array (DT) 722-110, a data bus 77-1109 of the data array (DT) 722-111, an address bus 77-1107 of the data arrays (DT) 722-112 and 722-113, a data bus 77-1110 of the data array (DT) 722-112, a data bus 77-1111 of the data array (DT) 722-113, write enable (WE) signal output circuits WE1 to WE5, chip select (CS) signal output circuits CS1 to CS5, and output enable (OE) output circuits OE1 to OE5. In this embodiment, like the embodiment of FIG. 1, each data array of the cache memory (SCM) is subdivided into two banks: a first bank consisting of DT 722-110 and DT 722-111 and a second bank consisting of DT 722-112 and DT 722-113. Moreover, each bank is further split into two sub-banks such that, although addresses are commonly used therebetween, SRAM control signals such as WE, CS, and OE can be independently applied thereto. Referring now to FIGS. 12A, 12B, 17A, 17B, 18, and 19, a description will be given of an effect developed with the provision of this embodiment in which the data arrays of the cache memory (SCM) are each subdivided so as to independently process the control signals.

In this regard, FIG. 12 shows an example of an error correction code (ECC) commonly adopted in a computer. When a computer system uses a copy-back type cache memory, the contents stored in the cache memory can be unique data in the computer system. If an error occurs in this situation, the data may possibly be lost as a result. In order to prevent such difficulty, it has been a common practice that an ECC is additionally employed. Incidentally, an example of the ECC has been described, for example, in page 117 of "Electro-Essentials No. 20" published from the Nihon Kogyo Gijutsu Center (Japan Industrial and Technological Center). In FIGS. 12A and 12B showing an ECC configuration capable of developing a correction of a one-bit error and detection of a two-bit error. FIG. 12A shows an example in which ECC data items ECC 0 and ECC 1 are respectively added to 32-bit data items DATA 0 and DATA 1, whereas FIG. 12B shows an example in which an ECC data item is added to a 64-bit data item. Each original data is of an identical bit size i.e. 64 bits; however, the total number of bits including the ECC bits varies therebetween, namely, 78 and 72 bits in FIGS. 12A and 12B, respectively.

Subsequently, the configuration of FIG. 17 showing another embodiment according to the present invention comprises, like the embodiment of FIG. 11, an SCM of which each data array is subdivided into two banks; moreover, each bank is split into two sub-banks to be operated in association with respectively independent control signals. In order to avoid complexity of the diagram, the signals WE, CS, and OE are not shown. The constitution of FIG. 17 includes a storage buffer (STB) 713-17, an address array (AA) 721-17 of the cache memory (SCM), data arrays (DT) 722-170 to 722-173 of the cache memory (SCM), comparator circuits (CMP) 71-1720 to 71-1725, address registers SAR 71-1726 and MAR 71-1727 to 1729, an AND gate 71-1730, input buffers 71-1708 to 71-1713, output buffers 71-1714 to 71-1719, mergers 71-1700 to 17-1703, ECC generator circuits 71-1704 to 71-1707, and selectors (SEL) 71-1731 to 71-1737.

Figure 18:
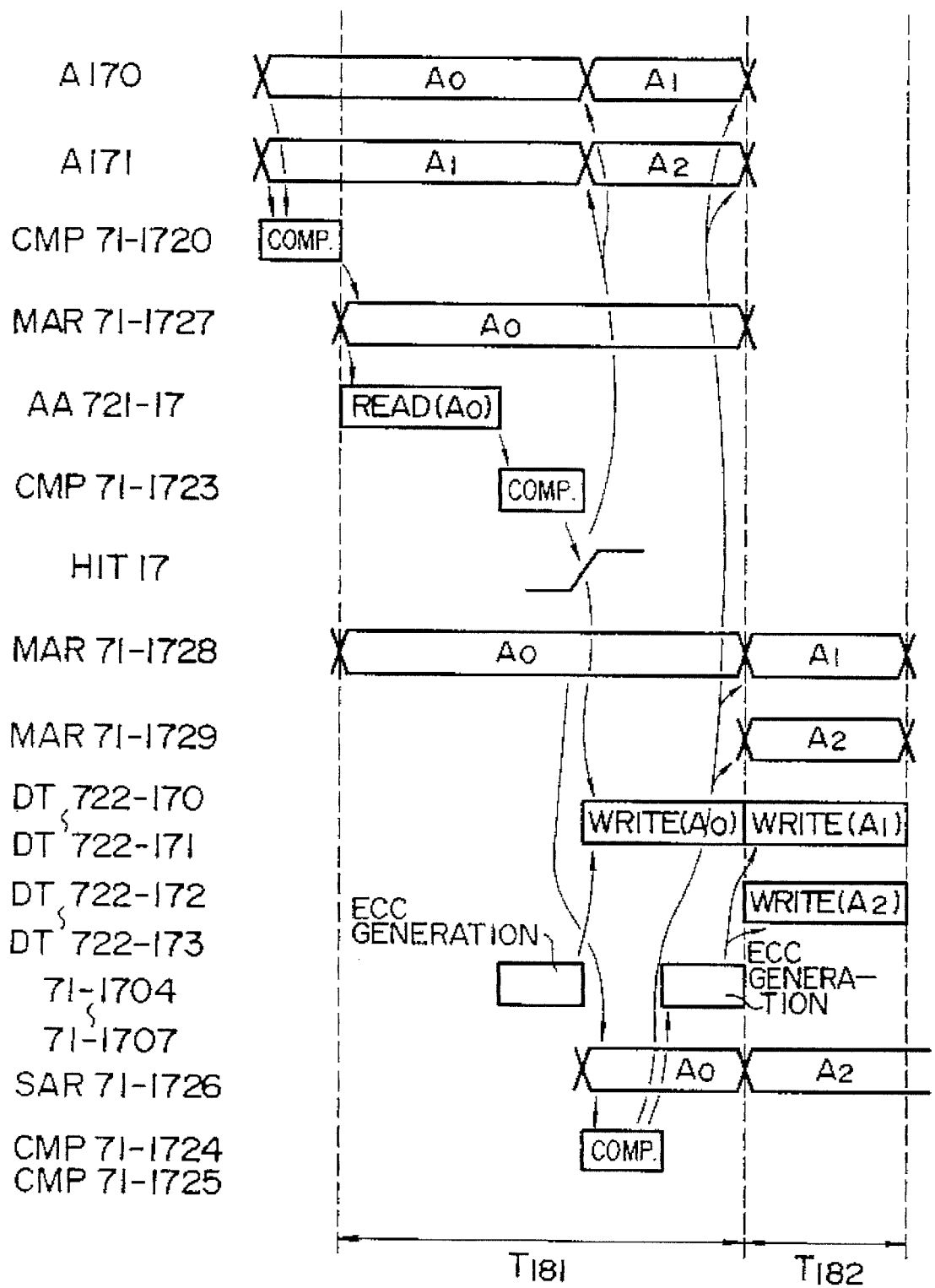
FIGS. 18 and 19 are diagrams showing operation examples of the embodiment of FIG. 17.

Next, FIG. 18 shows an operation example of the embodiment shown in FIG. 17. A description will now be given of the embodiment of FIG. 17 by referring to FIG. 18. First, in time period $T_{181}$ of FIG. 18, data items $D_{1700}$ and $D_{1701}$ are written into the cache memory (SCM). This operation is substantially identical to that shown in FIG. 9B in which a difference resides in that the ECC generation is carried out by the ECC generator circuits 71-1704 to 71-1707. In a subsequent period $T_{182}$, data items $D_{1710}$ and $D_{1721}$ are concurrently written on the cache memory (SCM). In this case, however, as in FIG. 9B, the comparator circuits (CMP) 71-1724 and 71-1725 are adopted to compare addresses with each other such that the address array (AA) 721-17 need not be accessed to read data therefrom when the write operation is achieved in the cache memory (SCM). Consequently, the period $T_{182}$ is reduced considerably as compared with the period $T_{181}$.

Figure 19:
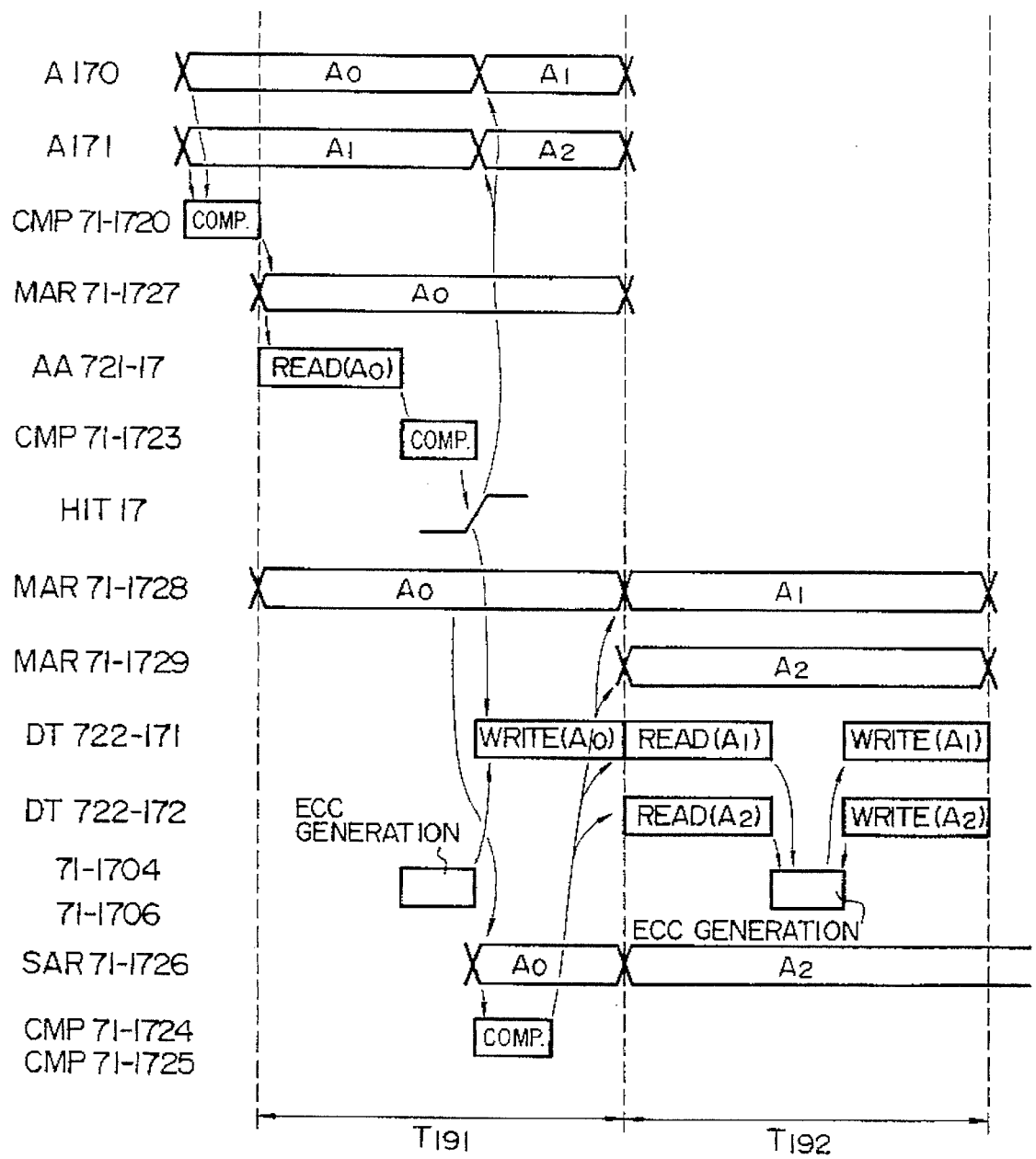

Next, FIG. 19 shows an operation of the embodiment of FIG. 17 when the ECC bits are added to the 64-bit data as shown in FIG. 12B in the data arrays of the cache memory (SCM). In this case, since the data items $D_{1710}$ and $D_{1721}$ each have a data width of 32 bits, when the ECC generator circuits 71-1704 and 71-1706 achieve an ECC generation, data are required to be read from the data arrays (DT) 722-171 and 72-172 in advance so as to merge the data with the data items $D_{1710}$ and $D_{1721}$, thereby creating ECC data based on the resultant data. Consequently, the period $T_{192}$ cannot be minimized. As can be seen from FIGS. 18 and 19, when each bank of the cache memory (SCM) is further subdivided into sub-banks to independently dispose control signals such as the WE signal for each sub-bank, it is possible to reduce the period of time required to write data in the cache memory (SCM).

Figure 13:
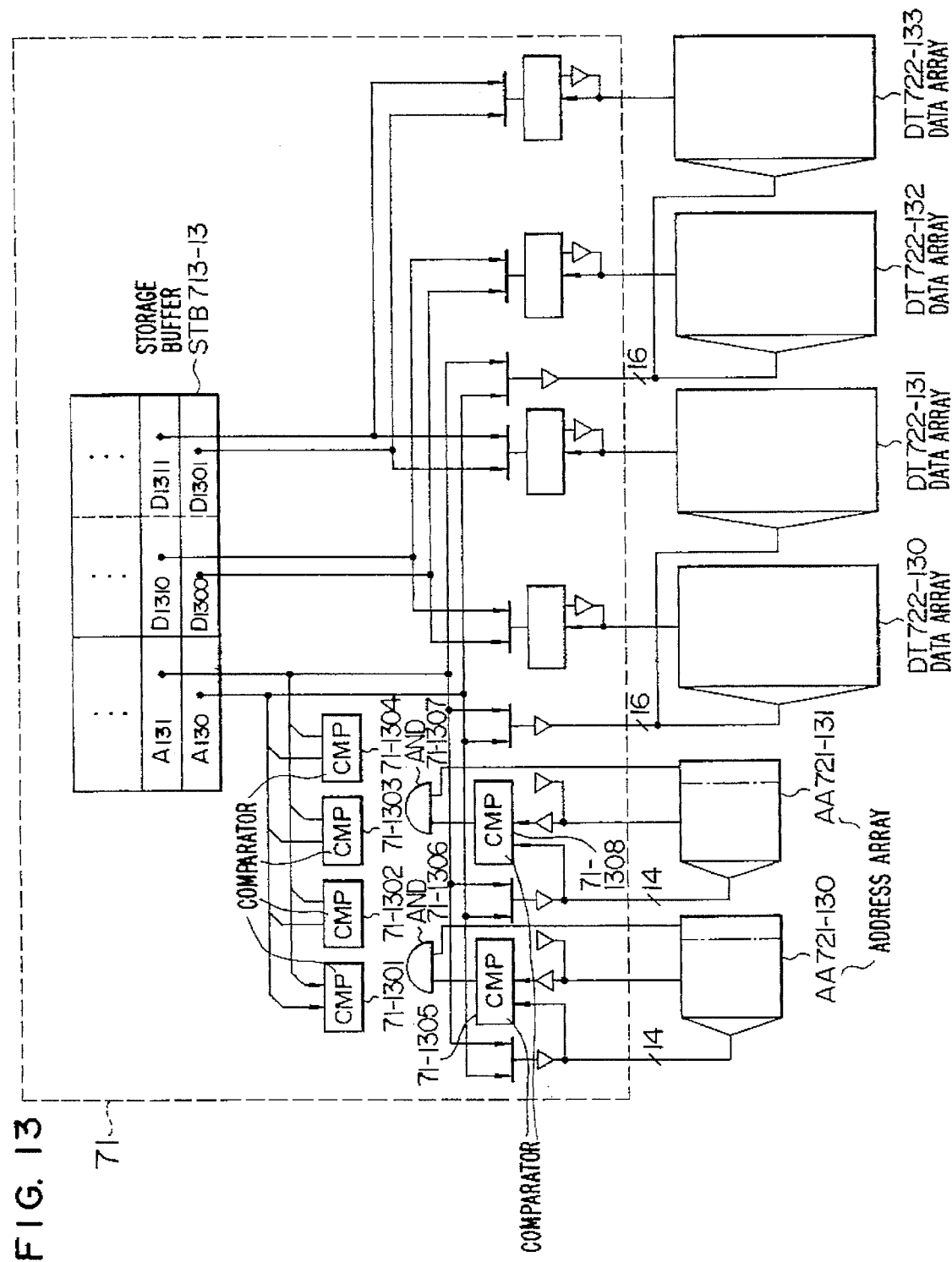
FIG. 13 is a schematic diagram showing yet another embodiment according to the present invention.

Next, FIG. 13 shows another embodiment of the present invention. This configuration includes address arrays (AA) 721-130 and 721-131 of the cache memory (SCM), data arrays (DT) 722-130 to 722-133 of the cache memory (SCM), comparator circuits (CMP) 71-1301 to 71-1306, and AND gates 71-1306 and 71-1307. In this embodiment, each data array of the cache memory (SCM) is subdivided in the same manner as for the configuration of data arrays of FIGS.. 11, 17A, and 17B. Moreover, the address array of the cache memory (SCM) is split into two banks AA 721-130 and AA 721-131.

FIG. 14 shows data layouts of data as comparison objects of the comparator circuits (CMP) 71-1301 to 71-1304, whereas FIG. 15 is a table showing operations processed according to comparison results associated with FIG. 14.

Figure 16A:
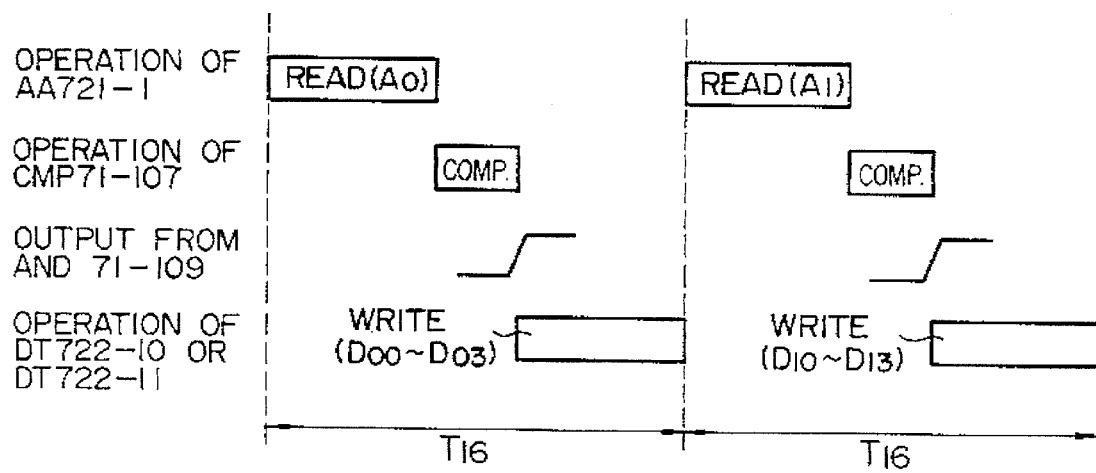
FIGS. 16A and 16B are diagrams showing operation examples related to the control method of FIG. 13.
Figure 16B:
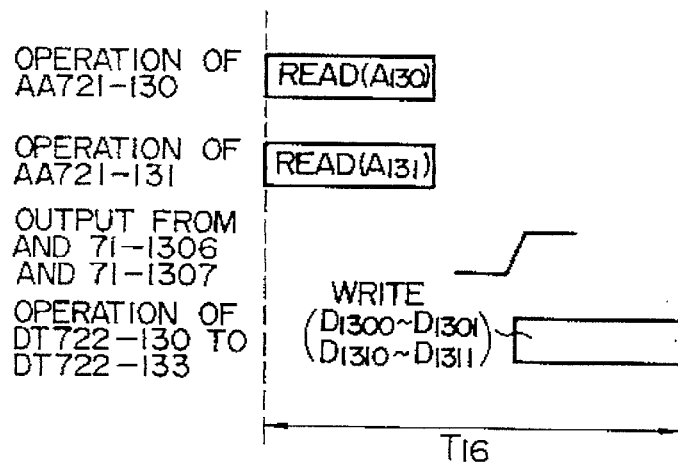
Figure 17A:
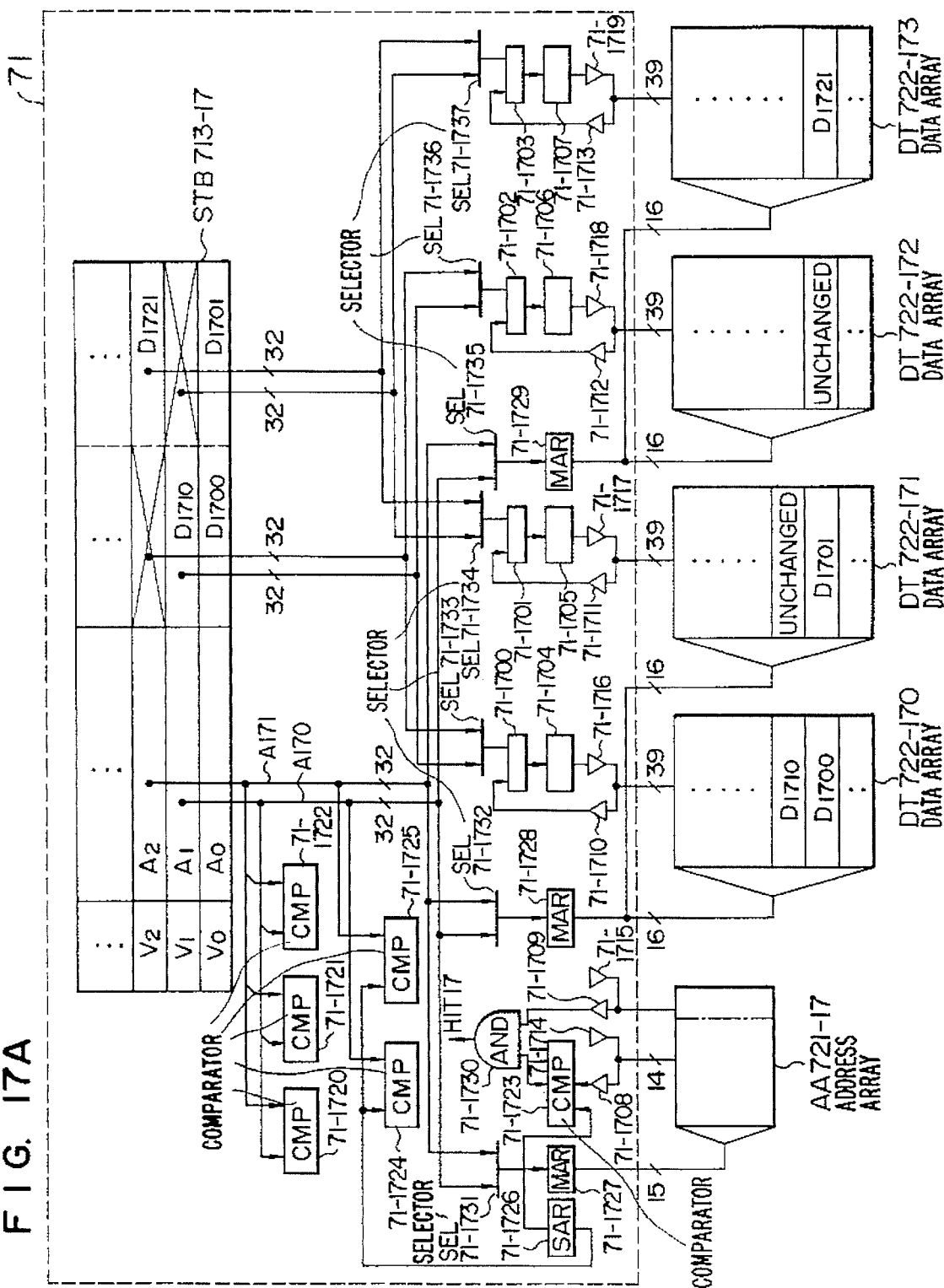
FIGS. 17A and 17B are diagrams schematically showing another embodiment according to the present invention.
Figure 17B:
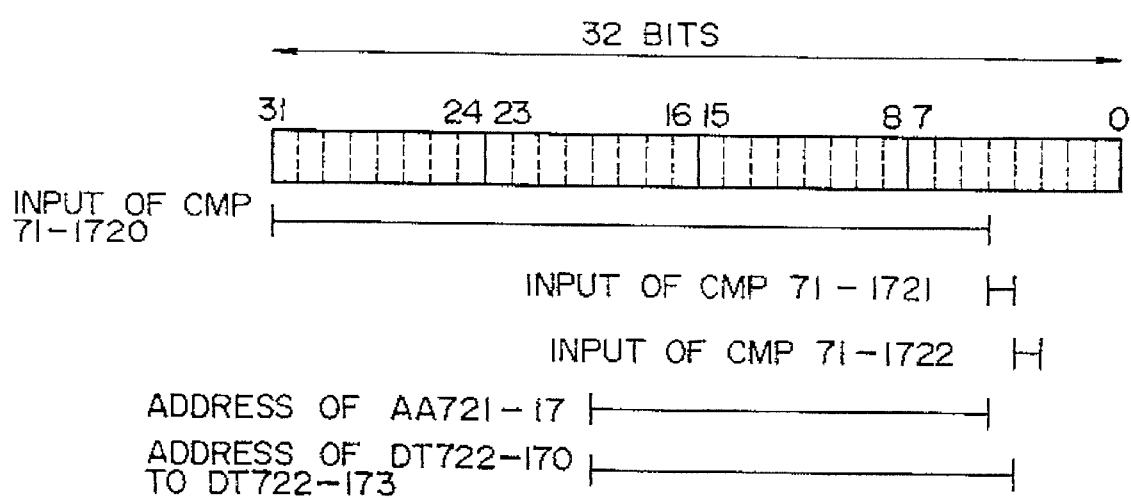

FIGS. 16A and 16B show in a comparative manner effect of the present invention in the embodiment of FIG. 13 between when the address array of the cache memory is not subdivided and when the address array is subdivided. FIGS. 16A and 16B show operation examples of the embodiments shown in FIGS. 1 and 13, respectively. When the addresses $A_0$ and $A_1$ are not in an identical block as shown in FIG. 16A, the associated entries cannot be written simultaneously in the cache memory (SCM). Consequently, the write operation of these entries requires a period of time which is twice the value of $T_{16}$. On the other hand, as shown in FIG. 16B, in the embodiment of FIG. 13, even when addresses $A_{130}$ and $A_{131}$ are not in an identical block, if the address banks respectively associated with these addresses are different from each other as in cases 6 and 7 of FIG. 15, the read operation of $AA_{130}$ and $AA_{131}$ can be simultaneously accomplished. That is, the write operation is completed in the period $T_{16}$ and hence the system develops a write throughput equal to substantially twice the throughput obtained in the embodiment of FIG. 1.

As described above, according to the present invention, (1) an address comparison is achieved within an entry set, (2) an address comparison is conducted between entry sets, and (3) the data arrays of the cache memory (SCM) are each subdivided into a plurality of banks. As a result, a plurality of storage buffer entries can be simultaneously written in the cache memory (SCM) so as to improve the throughput of the write operation on the cache memory (SCM). Moreover, (4) the unit of additional ECC bits can be varied in the data arrays of the cache memory (SCM), (5) the banks of the data arrays are each further subdivided into sub-banks so as to dispose independent control signals for the respective sub-banks, and (6) the address arrays of the cache memory are each subdivided into a plurality of banks.

With the provisions set forth above, the throughput of the write operation on the cache memory (SCM) can be increased.

In this connection, in the embodiments above, for example, the storage buffer includes a total of eight entries, the data field width of the storage buffer is four or eight bytes, the number of each data and address array is two, and the width of the address field is 32 bits; it is to be understood that the values above can be changed within the range where the effect of the present invention is attainable.

In accordance with the present invention, since a plurality of entries of the storage buffer (STB) can be simultaneously written in the cache memory (SCM), there is developed an advantageous effect that the write operation throughput of the cache memory (SCM) is increased. Moreover, the write operation can be accomplished without accessing the address array of the cache memory (SCM) to read data therefrom so as to advantageously minimize the period of time required for the write operation. In addition, when only a portion of the data field is effective in the storage buffer, the operation to read data from the data array is unnecessary for the ECC generation, which leads to an effect that the period of time required for the write operation is reduced.

As many apparently widely different embodiments of the present invention can be made without departing from the spirit and scope thereof, it is to be understood that the invention is not limited to the specific embodiments thereof except as defined in the appended claims.

We claim:

1. A cache memory control method for controlling a cache memory disposed between a central processing unit (CPU) and a main memory, said cache memory being subdivided into a plurality of banks, said method comprising the steps of:

storing in a first-in/first-out (FIFO) buffer included in said CPU a plurality of pairs of data and addresses, each of said pairs including data and an address to be written into respective data and address banks of said plurality of banks in said cache memory;

comparing respective address fields of said plurality of pairs of data and an address read from said buffer memory;

generating, based on results of said comparing step, a write control signal for writing said data in said cache memory; and simultaneously writing said plurality of pairs of data and an address each into respective ones of said plurality of banks of said cache memory using the write control signal determined by said generating step, said addresses of said pairs being different from each other.

2. A cache memory control method according to claim 1, wherein each of said plurality of banks of said cache memory is supplied with independent addresses, data, and write control signals, and the number of bits constituting said independent data within each of said plurality of banks of said cache memory equals the number of bits contained in a data field of each of said pairs of data and an address held in said buffer memory.

3. A cache memory control method according to claim 1, wherein said CPU is configured in a one-chip LSI which includes said buffer memory, and said cache memory includes an SRAM chip connected to said LSI.

4. A cache memory control method according to claim 3, wherein said data field of each of said pairs of data and an address stored in said buffer memory is 64 bits long, said buffer memory reads out two pairs of data and an address at the same time, said cache memory is subdivided into two banks;

a data field of each of said banks is 64 bits long, and each of said two banks has a data line connected to pins of said LSI, with a one-to-one correspondence established between said data lines and said pins.

5. A cache memory control method according to claim 4, wherein the operation to keep data to be written in said buffer memory in a 128-bit cache memory necessitates handling of two pairs of data and an address.

6. A cache memory control method according to claim 3, wherein said LSI includes therein a first layer cache memory, and a second layer memory includes an SRAM.

7. A cache memory control method for controlling a cache memory provided between a central processing unit (CPU) and a main memory, said cache memory being subdivided into a plurality of banks, said method comprising the steps of:

storing a plurality of pairs of data and an address, each of said pairs including data and an address to be written into respective data and address banks of said cache memory, in a first-in/first-out (FIFO) buffer included in said CPU;

providing a register including therein an address of said cache memory, said address being previously used for a write operation;

comparing an address field of said pair of data and an address read from said buffer memory with said register content; and generating, based on a result of said comparing step, a write control signal for writing said data in one of said plurality of banks of said cache memory.

8. A cache memory control method according to claim 7, wherein said CPU comprises a one-chip LSI including said memory, and said cache memory includes an SRAM chip connected to said LSI.

9. A computer including a cache memory disposed between a central processing unit (CPU) and a main memory, said cache memory being subdivided into a plurality of banks, comprising:

a first-in/first-out (FIFO) buffer included in said CPU having a plurality of entries therein for holding a plurality of pairs of data and an address, each of said pairs including data and one of said addresses to be written from said CPU into respective banks of said cache memory;

means for processing said plurality of pairs of data and addresses from said buffer memory for comparing respective address fields of said plurality of pairs of data and addresses;

means for generating, based on results of said comparisons, a write control signal for writing said data in said cache memory, said cache memory being subdivided into a plurality of banks; and means for simultaneously writing said plurality of pairs of data and addresses each into respective ones of said plurality of banks of said cache memory using the write control signal determined by said determining means, said addresses being different from each other.

10. A computer having a cache memory disposed between a central processing unit (CPU) and a main memory, said cache memory being subdivided into a plurality of banks, comprising:

a first-in/first-out (FIFO) buffer included in said CPU having a plurality of entries therein for holding data and addresses to be written into respective banks of said cache memory, said data and said addresses being paired with each other;

a register for holding therein an address of said cache memory, said address being previously used for a write operation therein;

means for comparing an address field of one of said pairs of data and an address read from said buffer memory with said register;

means for generating, based on a result of the comparison, a write control signal for writing said data into said cache memory.

* * * * *